United States Patent [19]

Cotton

[11] Patent Number: 5,232,065
[45] Date of Patent: Aug. 3, 1993

[54] MOTORIZED CONVERSION SYSTEM FOR PULL-TYPE GOLF CARTS

[76] Inventor: James T. Cotton, 4520 SE. Ina, Milwaukie, Oreg. 97267

[21] Appl. No.: 795,832

[22] Filed: Nov. 20, 1991

[51] Int. Cl.⁵ .............................................. B62D 51/04
[52] U.S. Cl. .................................... 180/11; 180/19.1; 280/DIG. 5; 280/DIG. 6
[58] Field of Search .................. 180/11, 19.1, 19.2, 180/19.3, 65.1; 280/47.34, DIG. 5, DIG. 6

[56] References Cited

U.S. PATENT DOCUMENTS

| | | | |
|---|---|---|---|
| D. 300,577 | 4/1989 | Pope et al. | D34/15 |
| 3,059,713 | 10/1962 | Beggs | 180/19.1 |
| 3,199,621 | 8/1965 | Seaman | 180/11 |
| 3,407,892 | 10/1968 | Vosseller | 180/19.1 |
| 3,583,510 | 6/1971 | Hastings | 180/11 |
| 3,719,247 | 3/1973 | Hollis | 180/19.3 |
| 3,726,537 | 4/1973 | McLoughlin | 280/DIG. 6 |
| 3,753,473 | 8/1973 | Hollis | 180/19.3 |
| 3,941,198 | 3/1976 | Kappas | 180/11 |
| 4,019,597 | 4/1977 | Carmichael | 180/11 |
| 4,105,084 | 8/1978 | Baak | 180/11 |
| 4,356,875 | 11/1982 | Clune | 280/DIG. 5 |
| 4,615,406 | 10/1986 | Bottenschein et al. | 180/19.1 |
| 4,762,193 | 8/1988 | Levine | 180/65.1 |
| 4,936,598 | 6/1990 | Lee | 280/DIG. 6 |
| 4,974,693 | 12/1990 | Nakai et al. | 180/19.3 |

FOREIGN PATENT DOCUMENTS 2196591 5/1988 United Kingdom ......... 280/DIG. 5

OTHER PUBLICATIONS

Powa Kaddy Sales Literature.

Primary Examiner—Margaret A. Focarino
Assistant Examiner—Kevin Hurley
Attorney, Agent, or Firm—Kolisch, Hartwell, Dickinson, McCormack & Heuser

[57] ABSTRACT

A power unit is provided for attachment to a non-motorized golf cart. The power unit converts the cart to a motorized golf cart of the type used to support and carry a golf bag. The power unit includes a motor, drive wheel assembly and battery support, all attached to a single leg which, in turn, is attachable to the frame of the golf cart by means of a releasable coupling which permits the leg to be oriented selectively, at different angles, relative to the golf cart frame. The releasable coupling also allows the leg to be folded against the frame when the cart is collapsed for transport and storage. A pair of relatively closely-spaced drive wheels, mounted on a unitary axle, supports the forward end of the cart and power unit. The drive wheels contact the ground and a reversible motor pushes or pulls the cart in the direction selected by the user. A control box is mounted on the handle of the golf cart to control the speed and direction of the motor. The power unit can be added to any conventional pull-type golf cart, converting it to a motorized cart.

17 Claims, 3 Drawing Sheets

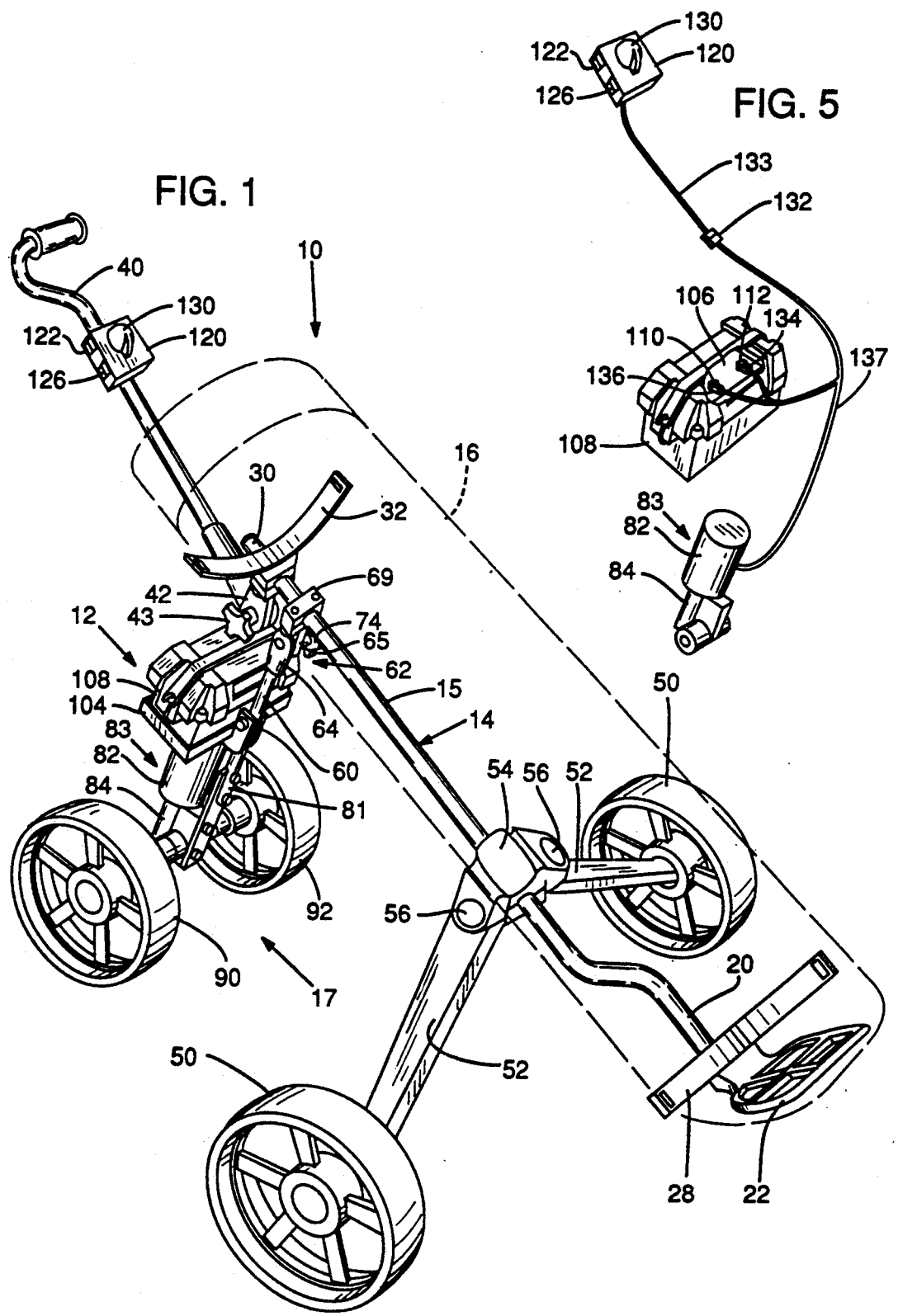

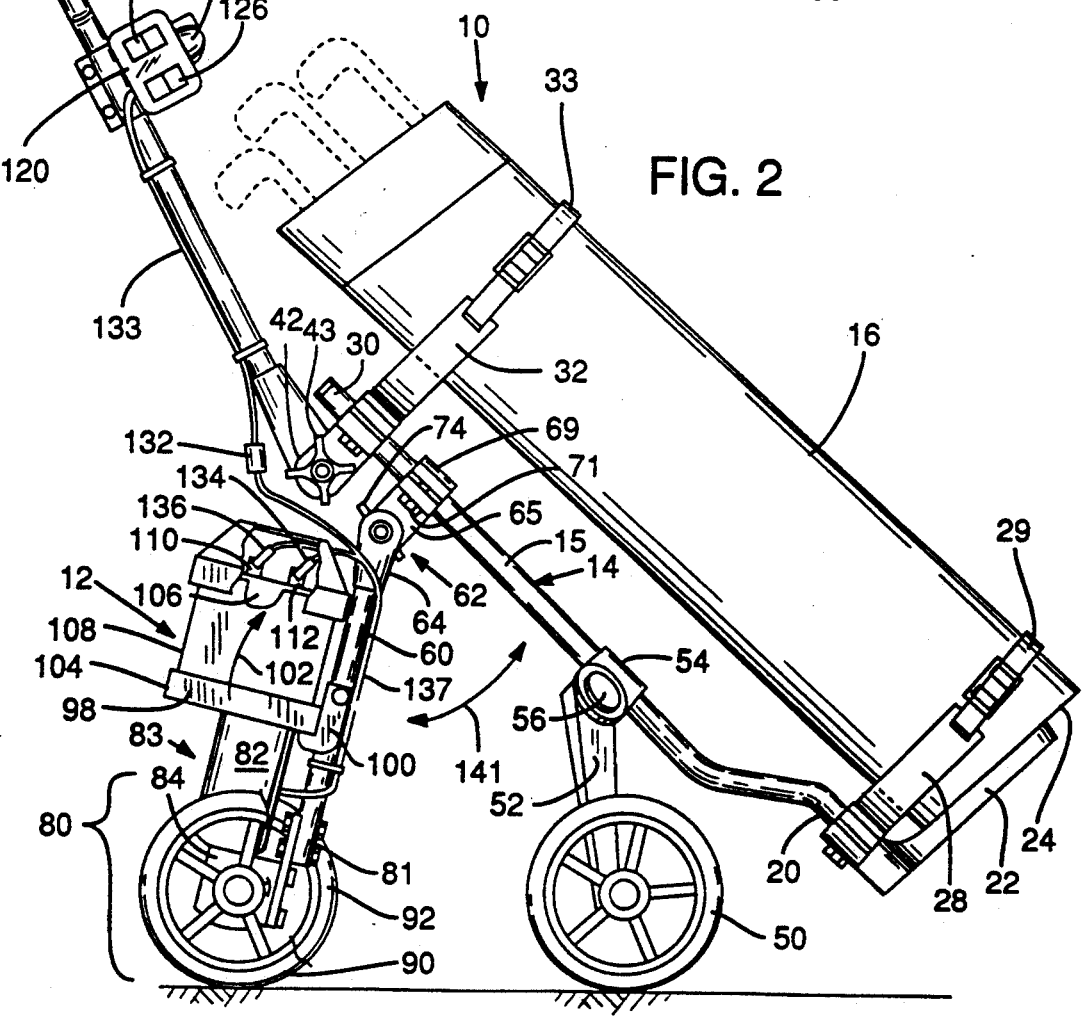

MOTORIZED CONVERSION SYSTEM FOR PULL-TYPE GOLF CARTS

BACKGROUND AND SUMMARY OF THE INVENTION

The present invention relates to pull-type golf carts of the type used to carry a golf bag, together with clubs and related accessories. In particular, it relates to a motorized conversion system for making such pull-type golf carts self-propelled.

Pull-type golf carts are lightweight, two-wheeled carriages for holding and supporting a golf bag. Such carts have a handle at the forward end which is grasped by the user and pulled in a trailing manner. Most of the weight of the golf bag and clubs is supported by the cart wheels, which are mounted on opposite sides of a bag-carrying frame. When the cart is stopped, it is tilted upwardly and the base of the frame supporting the golf bag is set on the ground behind the wheels, forming a three point stand. Most golf carts are made of tubular steel or aluminum frame members. Portable carts, intended for easy transport, usually include some type of mechanism for collapsing the wheels and handle against the bag support frame to allow the cart to fit in the trunk of a car.

Several prior art systems have been developed for motorizing pull-type golf carts. Examples of systems which add a motor unit to a conventional golf cart are found in U.S. Pat. Nos. 3,719,247; 3,753,473; 3,941,198; 4,105,084; and 4,615,406. Examples of systems developed as dedicated motorized carts (i.e., not intended to be pulled by hand) are found in U.S. Pat. Nos. Des. 300,577 and 4,974,693.

One problem with the prior art systems for adding a motor to conventional pull-type golf carts is the complex and cumbersome procedures required to connect and disconnect the motorizing unit. For example, in U.S. Pat. No. 3,719,247, the power unit is suspended between the cart wheels and separate drive shafts must be connected to each of the cart wheels. U.S. Pat. Nos. 3,753,473 and 3,941,198 include multiple points of attachment between the add-on power unit and the cart, complicating attachment and detachment procedures. Prior art conversion systems also tend to be excessively heavy, incorporating pivoting or steerable drive wheels, as in U.S. Pat. Nos. 3,941,198 and 4,615,406, which add weight and complexity. Furthermore, most prior art add-on motorizing units interfere with the collapsibility of the cart and must be removed before the cart can be collapsed for transport and storage. Dedicated motorized golf bag carts tend to be even heavier and more cumbersome to dismantle and transport than carts with add-on motorizing units.

Since a golfer who owns a pull-type or motorized golf bag cart, and who plays at more than single golf course, will want to transport the cart from place to place, ease of transport is a important concern. It would be advantageous to have a power unit which can be quickly and easily added to a pull-type golf cart for motorizing the cart and which can also be collapsed against the cart for convenient transport.

It would be particularly advantageous to have a power unit for motorizing a pull-type golf cart which did not have to be removed each time the cart was collapsed for transport.

It would also be advantageous if such a power unit for motorizing a pull-type golf cart was relatively lightweight and simple to manufacture, install and use.

Accordingly, the invention provides a power unit for attachment to a non-motorized golf cart of the type having a pair of cart wheels, a handle for moving and steering the cart, and a bag support frame for holding a golf bag. The power unit comprises a leg for attachment to the bag support frame of the cart, and a releasable coupling for securing the leg to the bag support frame in a selection of orientations relative to the bag support frame. An electric motor and drive wheel assembly is supported on the leg. The drive wheel assembly includes a rotatable axle driven by the motor, and a pair of drive wheels attached to the axle. A battery support is attached to the leg for supporting a battery to energize the motor. And a motor controller is connected electrically to the motor and connectable to a battery for controlling the motor.

In its preferred form, the invention includes a single leg attached to the upper end of the golf cart frame, adjacent the point where the handle of the cart attaches to the frame. When the power unit is in its operable or "working" configuration (i.e., not collapsed), the leg extends downwardly at a large acute or perpendicular angle relative to the frame of the cart. The drive wheels mounted on the distil end of the leg, opposite the end attached to the golf cart frame, support the upper, front end of the cart and engage the ground to push or pull the cart along as the motor turns. The motor controller is affixed to the golf cart handle at a convenient location, providing selectable on/off, speed, and directional (i.e., forward/reverse) control. For transport, the releasable coupling between the leg and cart is loosened and the le is folded toward the frame into its collapsed configuration. In the collapsed configuration, the power unit is moved to a position against or adjacent the frame of the golf cart, in which the leg assumes a smaller acute or zero angle relative to the frame. In its collapsed configuration, the motor, wheels and other parts of the power unit are positioned close to the frame of the cart, with the power unit drive wheels nested between the cart wheels. The power unit need not be detached for transport, although the battery on the battery support is preferably removed. The unit does not appreciably interfere with the collapsibility of the cart wheels of a conventional, collapsible golf cart.

BRIEF DESCRIPTION OF THE DRAWINGS

FIG. 1 is a perspective view of a power unit in accordance with the present invention attached to a prior art, non-motorized golf cart of a type which is collapsible, creating a motorized golf cart in accordance with the present invention.

FIG. 2 is a side view of the golf cart and power unit shown in FIG. 1.

FIG. 3 is a plan view, on a slightly enlarged scale, showing the power unit of the motorized cart of FIGS. 1 and 2, viewed from the left in FIG. 2.

FIG. 5 is a schematic depiction of the wiring harness for the power unit of FIGS. 1-3.

DETAILED DESCRIPTION OF THE PREFERRED EMBODIMENT

Figure 4:
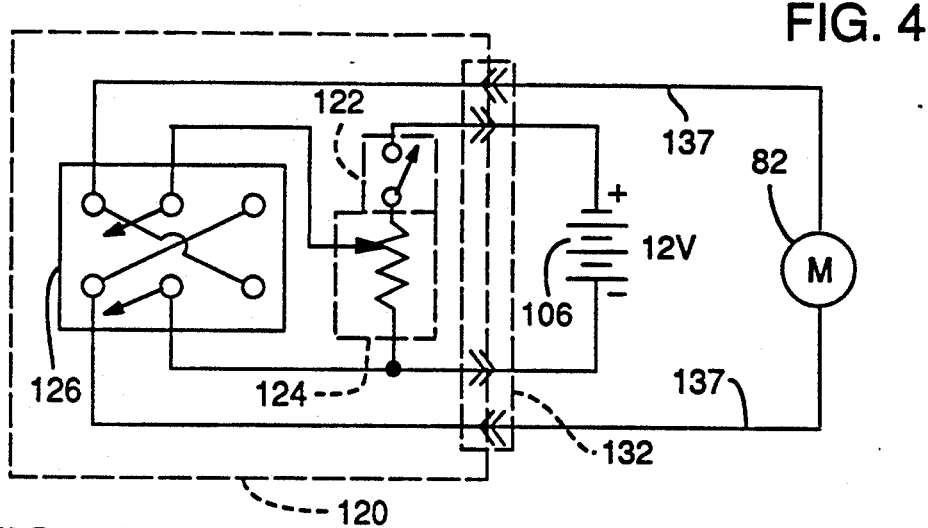
FIG. 4 is a schematic block diagram of the electric circuitry used to control the power unit of the present invention.

Referring to FIG. 1, a conventional pull-type, non-motorized golf cart 10 is shown with the power unit 12 of the present invention added to the cart. The term golf cart, when used herein, refers to a bag-carrying cart, whether motorized or not, and not to other, larger types of golf carts designed to carry both persons and golf bags. Golf cart 10 includes a bag support frame 14 having a centrally-disposed, tubular central member 15 which extends longitudinally parallel with a golf bag 16 supported on the cart. Central member 15 is angled upwardly in toward the front of cart 10, which is the direction of arrow 17 in FIG. 1 and to the left in FIG. 2. Frame 14 has a lower end 20, also called the first end 20, which is at the rear of the cart, where the frame and attached golf bag are near the ground. Attached to first end 20 of central member 15 is a bag support plate 22 against which the bottom 24 (see FIG. 2) of golf bag 16 rests. A curved bracket 28 serves as a strap holder for a lower strap 29 (see FIG. 2) used to encircle the bottom of the golf bag to hold the bag on the cart. At the upper or forward end 30 of the central member 15 of frame 14, also called the second end, is a second bracket 32 for holding a strap 33 which encircles the upper end of bag 16.

A handle 40 for moving and steering the cart is attached to central member 15 of frame 14 adjacent second end 30. On most collapsible carts, handle 40 is attached to the frame by means of a resetable, releasable coupling 42 which allows the handle to be pivoted relative to frame 14 and allows the handle to be set in selected orientations relative to cart frame 14. Coupling 42 includes a threaded set-screw or bolt with a wing-nut or knob 43 which is tightened to draw together adjacent halves of the coupling to fix the relative orientations of the coupling elements which encircle the bolt. When the bolt is released by loosening knob 43, the handle can be moved between its extended position, shown in FIG. 1, and a collapsed position, wherein the handle is folded downwardly.

Figure 6:
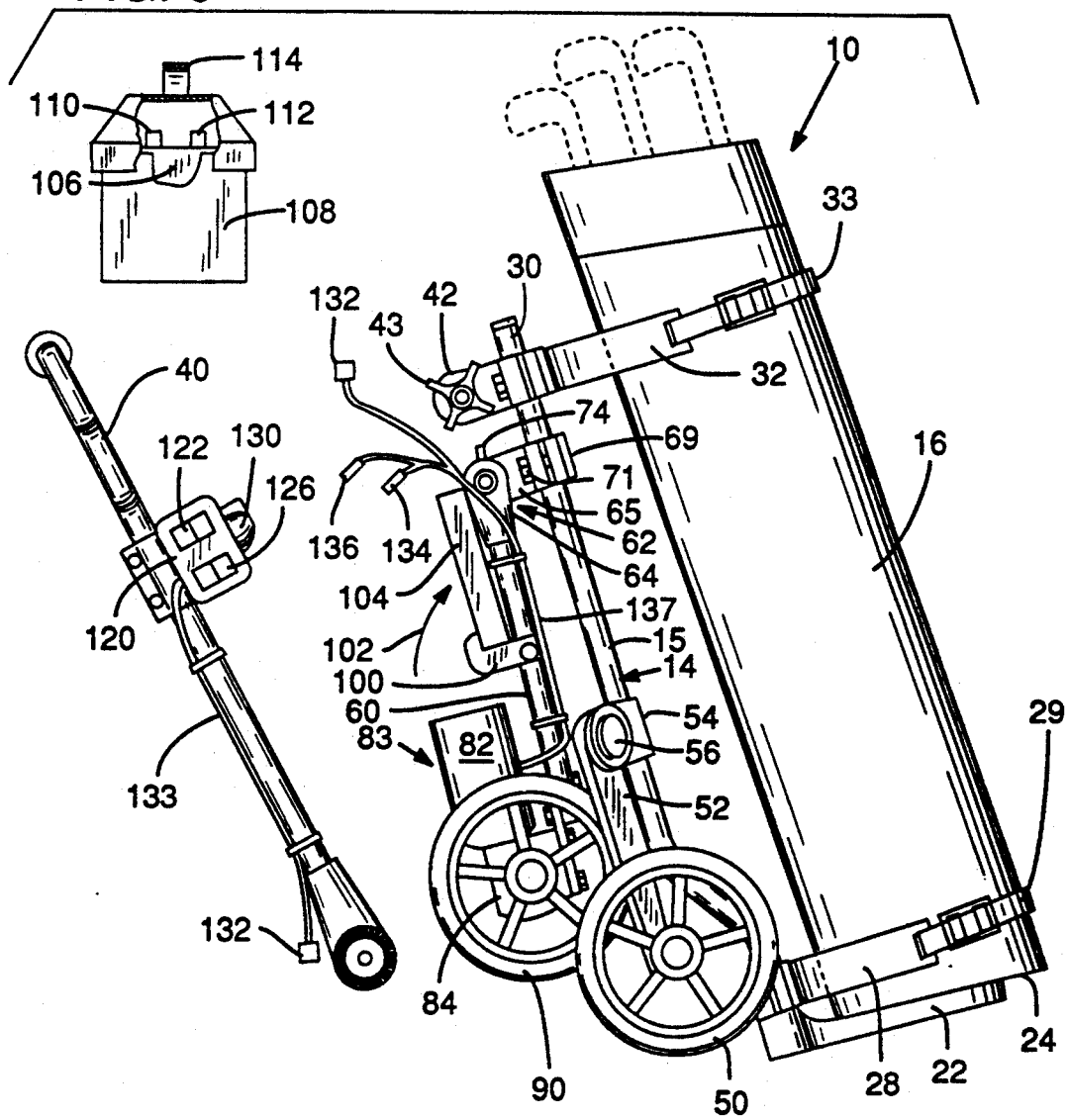
FIG. 6 is a side view as in FIG. 2 showing the power unit and golf cart in a collapsed configuration.

Cart wheels 50 are attached to frame 14 by a pair of angled struts 52, also called wheel-support members. Struts 52 are attached to central member 15 of frame 14 at a point on the frame, centrally disposed between the first and second ends 20, 30, respectively. An attaching yoke 54 clamped onto central member 15 connects wheel struts 52 to frame 14. The wheel struts 52 include pivots 56 adjacent the clamping yoke 5 to allow the struts to pivot. A locking and releasing mechanism is incorporated into wheel-strut pivots 56, permitting the wheels 50 to be locked in either the extended, operable position, shown in FIG. 1, or the collapsed position, shown in FIG. 6. When the struts are in the operable position, the wheels 50 are spaced apart, away from frame 14, on opposite sides of central member 15. When the struts 52 are folded against frame 14, the wheels are drawn closer to central member 15, making the cart less bulky and allowing for easier transport and storage. Suitable detents or other devices (not shown) are customarily incorporated into the wheel strut pivot mechanisms 56 to allow the wheels to be locked in either the extended or collapsed positions. On some carts, wheel struts 52 incorporate a parallel-bar linkage (not shown) to maintain the mutual parallel orientation of wheels 52, when collapsed (as illustrated in FIG. 6).

The foregoing has been a description of a conventional, prior art pull-type golf cart. What follows is a description of the add-on power unit of the present invention for converting cart 10 into a motorized golf cart in accordance with the present invention. Referring to FIGS. 1-3, the power unit 12 of the present invention is positioned below the central member 15 of cart frame 14, forward of cart wheels 50. The power unit 12 includes a leg 60 for attachment to bag support frame 14. Leg 60 is a generally straight, unitary, tubular shaft which attaches to the central member 15 of frame 14 by means of a releasable coupling 62.

Coupling 62 is preferably a multidirectional hinge device which allows leg 60 to be secured to the golf cart in a selectable orientation relative to the bag support frame. A preferred type of coupling which is suitable for this purpose is handle coupling 42, previously described, used to secure handle 40 to cart frame 14. Referring to FIGS. 2 and 3, coupling 62 is preferably a hinge joint having two adjacent, generally circular, projecting members 65, 68, which are rotatable relative to one another. One projecting member 65 is affixed to frame 14 on cart 10 and the other projecting member 68 is affixed to a first end 64 (the upper end) of leg 60. Projecting member 65 is clamped onto central member 15 of frame 14, adjacent second end 30 and adjacent the attachment point for handle 40, by means of a tubular encircling clamp 69 of any conventional type. A pair of bolts 71 (one of which is shown in FIG. 2) may conveniently be employed to attach clamp 69 to central frame member 15. The adjacent circular projecting members 65, 68 of hinge coupling 62 are positioned side-by-side, with mutually-engaging, facing surfaces 70, 72, respectively. An opening extends through the center of both projecting members for receiving a bolt or other threaded fastener. Preferably a bolt 73 is permanently mounted on projecting member 68. The shank of bolt 73 extends through member 68 and its threaded end 75 projects outwardly from surface 72 of member 68. Alternatively, shank 75 can be a stud projecting from face 72 of member 65. A cooperating opening (not shown) is centrally disposed through projecting member 65. When projecting member 65 is positioned adjacent projecting member 68, the threaded end 75 of bolt 73 is passed through the opening in projecting member 65. The threaded end 75 of bolt 73 serves as a pivot axis around which the projecting members 65, 68 are respectively turned to form a hinge joint.

To clamp or squeeze members 65, 68 together, a wing nut or threaded knob 74 is installed over the threaded end 75 of bolt 73 and tightened. When knob 74 is tightened, the relative orientations of projecting members 65 and 68 are fixed, as are the relative orientations of leg 60 and cart frame 14, to which the projecting members are attached. Facing surfaces 70, 72, on projecting members 65, 68 preferably incorporate texturing or ridges to inhibit rotational slippage between the two halves of the coupling, once knob 74 has been tightened on bolt 73. Leg 60 can be moved to any desired position or angular orientation with respect to cart frame 14 by loosening knob 74, repositioning leg 60 and retightening knob 74. If knob 74 is removed from bolt 73, the leg can be separated from the cart by separating the two halves of coupling 62. Releasable coupling 62 allows leg 60 to be secured to cart frame 14 in a selected orientation and allows the user to change the orientation as needed or desired.

An electric motor and drive wheel assembly 80 is attached to and supported on leg 60, at or near the lower or second end 81 of the leg. Referring to FIGS. 2 and 3, the motor and drive wheel assembly 80 is a combination motor/worm gear/right-angle transmission, termed a motor assembly 83, which is generally manufactured and sold as a unit. The preferred motor used in assembly 83 is a 12-volt DC reversible motor. The output shaft of the motor (not shown) extends generally parallel to leg 60. A worm gear transmission 84 drives a transverse output shaft 86 extending outwardly from both sides of transmission housing 88. Output shaft 86 forms the axle on which a pair of drive wheels 90, 92 are mounted. The drive wheels are mounted to turn with shaft 86. One type of motor and transmission assembly suitable for use in the power unit of the present invention is a wheelchair-drive motor, modified for 12-volt operation. An example of such a motor assembly is a Model M-4100G-14, manufactured by Rae Corporation of McHenry, Ill. The preferred specifications for the motor assembly is as follows: maximum output speed (for axle 86)=132 r.p.m.; maximum torque=40-in.-lbs.; shaft diameter=½-inch; and voltage=12-volts D/C. Drive wheels 90, 92 are preferably 9-inch wheels of the same kind and size as cart wheels 50 on golf cart 10. The overall length of drive shaft axle 86, from wheel 90 to wheel 92, is between 8- and 10-inches.

A battery support 98 is attached to leg 60 for carrying a conventional rechargeable storage battery. Battery support 98 is in the form of a hinged support plate mounted above drive motor 82. Battery support plate 98 is preferably attached to leg 60 by means of a hinge 100, which allows support plate 98 to be pivoted upwardly against leg 60 in the direction of arrow 102 (see FIG. 2) when the battery is removed. Support plate 98 preferably includes upwardly-extending side walls 104 surrounding the bottom of the plate, producing a shallow pan enclosure which helps to retain a battery 106 on plate 98. Battery 106 is a conventional 12-volt rechargeable automotive or wheelchair-type battery and is preferably enclosed within a plastic housing 108. The housing is useful for covering and enclosing the battery terminals 110, 112 and helps contain any battery fluid which might escape from the battery during use. Preferably, either the battery or battery case is provided with a carrying handle 114 (shown in cross-section in FIG. 6) to facilitate lifting the battery off support plate 98 for transport, storage and recharging.

Control circuitry and the wiring harness for the power unit of the present invention are illustrated schematically in FIGS. 4 and 5. Motor 82 receives power from battery 106 through a motor controller 120, housed in a control box mounted on cart handle 40. The circuit diagram of FIG. 4 illustrates schematically the internal elements of control box 120, including an on/-off switch 122, speed controller 124 and forward/reverse switch 126. Speed controller 124 is shown as a variable resistance element, although it is within the scope of the present invention to use a different type of speed controller. One such alternative type of speed controller uses a D/C chopper, together with a pulse width modulator, to control motor speed by rapidly switching the motor on and off. In such a speed controller (termed a pulse-width-modulator or p.w.m.) the speed of the motor is increased or decreased by enlarging or reducing the percentage of time that power is supplied to the motor. Such p.w.m. controllers are well known in the art and have the advantage of using less power and producing greater motor torque at slow speeds than variable resistance controllers, although p.w.m. controllers are more expensive. The selection of the speed control device used at 124 in control box 120 is a matter of design choice, within the scope of the present invention, and either a variable resistance or p.w.m. controller can be used to control the motor speed in the power unit.

The exterior shape and configuration of control box 120 is shown in FIGS. 1-2 and 5-6. Box 120 includes a speed control knob 130 for setting the speed of motor 82 by selectively adjusting controller 124 (in FIG. 5). On/-off switch 122 is preferably a see-saw switch mounted on the side of control box 120. Forward/reverse switch 126 is preferably another see-saw switch used to select the direction of travel of motor 82. Some users of the power unit of the present invention may prefer to walk in front of the golf cart while others may prefer to follow the cart as it moves ahead of the user. Switch 126 allows the power unit to be operated in either direction.

The rest of the wiring harness for power unit 12 is shown in FIG. 5, with the rest of the motorized cart removed for clarity. A four-lead wire 133 extends from controller 120 along handle 40 to battery 106 and motor 82. A four-prong coupling plug 132 allows convenient separation of the handle end of cable 133 from the rest of the wiring harness. The connections contained in plug 132 are depicted schematically in FIG. 4. Connections are made to the positive and negative terminals on battery 106 using a pair of conventional jaw-type spring connector clips 134, 136 (see FIG. 5). Two motor connection leads 137 extend to motor 82 (see FIGS. 4 and 5). Connector 132 provides a simple means of disconnecting the control box 120 from the rest of the wiring harness, allowing the user to easily remove the cart handle from the cart.

The power unit of the present invention can be conveniently collapsed against cart 10 for transport and storage. The power unit and cart are shown in their "working" or operating configurations in FIGS. 1 and 2. In the operating configuration, handle 40 is extended outwardly from frame 14 and wheels 50 are spread apart from each other. The support leg 60 of power unit 12 is oriented at a large acute angle, or perpendicular, to control member 15 of cart frame 14. What is meant by a large acute angle is an angular displacement between leg 60 and central member 15 of the golf cart (indicated at 141 in FIG. 2) which is generally in the range of 60°-90°. On most conventional carts to which power unit 12 is attached, that angular relationship tilts the cart forward enough to rest some of the weight of the cart on drive wheels 90, 92, providing an appropriate center of gravity for motorized operation of the cart.

To collapse power unit 12 and cart 10, in the manner shown in FIG. 6, battery 106 is removed from the power unit, preferably together with battery case 108, using lift handle 114. The battery is removed after connector clips 134, 136 have been disconnected from battery terminals 110, 112. Support plate 98 is then tilted upwardly against leg 60 in the direction of arrow 102 (see FIG. 2) to the position shown in FIG. 6. Releasable coupling 62 is then loosened by turning knob 74 and leg 60 is rotated against cart frame 14 until the leg is approximately parallel with central member 15 and angle 141 (FIG. 2) has been reduced to or near 0° or in the range of 20° to 0°. The wheels 90, 92 on the power unit are spaced closer together than wheels 50 on cart 10, even when the wheel struts 56 are moved to the collapsed configuration of FIG. 6. That means the wheels of the power unit will nest between the wheels of the cart, when the cart is collapsed. After the cart wheels have been collapsed, handle 40 is pivoted downwardly over the power unit or, preferably, removed entirely from the cart, as shown in FIG. 6. Removal of the handle is accompanied by separation of the two halves of connector 132 and the loosening and removal of knob 43. Without the battery, the cart and power unit are light enough to be lifted into the trunk of a car, even with a golf bag and clubs attached to the cart. The battery ca be conveniently recharged by any conventional means.

The power unit, when mounted on a collapsible golf cart, provides a motorized cart for carrying a golf bag which is convenient to use and to transport. When the cart is in its "working" or operational configuration (i.e., not collapsed) the cart rests on four wheels, the two drive wheels in front and the two cart wheels in back. Drive wheels 90, 92 power the cart in either the forward or reverse direction, with the cart wheels 50 supporting and stabilizing the cart as it moves over the ground. The motorized golf cart, resulting from a combination of power unit 12 and a conventional golf cart 10, greatly reduces the effort required by a golfer to transport his or her clubs, while permitting the golfer to gain enjoyment and exercise from walking.

The power unit of the present invention can be added to virtually any kind of golf bag cart. Only two elements need to be attached to the cart. One is the releasable coupling device that supports the leg of the power unit, which must be attached to the frame of the cart. The second is the control box 120 which must be attached to the handle. The only wiring which must be added to the cart is the wire 133 extending from control box 120 to connector 132. The remainder of the wiring is supported on power unit 12. The power unit does not need to be removed from the cart for transport or storage. Should the user desire to temporarily remove the power unit and simply pull the golf cart, the two halves of the leg-support coupling 62 can be separated, leaving in place the part 65 attached to the cart frame by bracket clamp 69. Control box 120 can be left on handle 40. Whenever the user desires to resume use of the power unit, it is simply reattached to bracket 69, the halves of the connector plug 132 are reattached, and the cart becomes a motorized cart. The entire installation process takes, at most, a few minutes.

The use and operation of the power unit which provides the motorized golf cart of the present invention is simple and straightforward. It has been the preference of the inventor to operate the cart in a reverse direction, with the cart moving ahead and the user trailing behind grasping the handle to steer. The user simply switches on the on/off switch 122 whenever he or she desires to move the cart ahead, adjusting speed control knob 130 as necessary. Steering is accomplished by guiding the cart with handle 40. The narrow spacing of drive wheels 90, 92 allows the user to easily redirect the cart by simply pushing it or urging it in the desired direction. To stop the cart, the user simply switches on/off switch 122 to the off position.

The power unit of the present invention eliminates much of the complexity and weight of prior art motorizing units for golf carts. The entire drive train and power supply is mounted on a single leg, which can be easily attached and detached from the golf cart. Complex drive trains and pivot systems, which add weight, are eliminated. All parts of the power unit are preferably made of aluminum, to save weight and eliminate rust. That includes leg 60, battery support 98 and hinge 100, as well as releasable coupling 62 and the metal parts of wheels 90, 92. Only the motor assembly 81 is not aluminum and it is enamel-coated to inhibit rust.

The power unit, when added to a golf cart, is easy to assemble, transport and store. The power unit is collapsible with the cart. Except for removal of the battery (and detachment of the cart handle, which is optional) there is no need to dismantle or disconnect any part of the power unit for transport or storage. With the power unit attached to the golf cart, the cart becomes a four-wheeled cart which is stable on relatively level ground. Use of the motorized cart eliminates much of the carrying effort required for golf while permitting the user to exercise by walking with the cart. The power unit is safe and rugged and easily attachable to any conventional type of golf cart. In particular, the adjustability of the angle between leg 60 and cart frame 14 allows the power unit to be attached to virtually any size, type or configuration of golf cart because the power unit can be oriented to whatever position is necessary to support and move the cart. In that way, the power unit of the present invention represents a considerable advance in flexibility and adaptability over prior art golf cart motorizing devices.

What is claimed is:

1. A power unit for attachment to a non-motorized golf cart of the type having a pair of cart wheels, a handle for moving and steering the cart, and a bag support frame for holding a golf bag, the power unit comprising:

a single, unitary leg having opposed first and second ends, a releasable coupling for releasably securing said first end of said leg to the bag support frame of the golf cart, an electric motor and drive wheel assembly attached in a fixed nonpivotable orientation to said leg adjacent said second end thereof, the drive wheel assembly including a rotatable axle driven by said motor, said axle extending transverse to said leg, and a pair of drive wheels attached to said axle, a battery support attached to said leg for supporting a battery to energize said motor, and a motor controller connected electrically to said motor and connectable to said battery for controlling said motor.

2. A power unit as in claim 1 in which said leg and said rotatable axle are generally perpendicular to one another.

3. A power unit as in claim 2 in which said releasable coupling includes a pivot which permits orientation of said leg at a selected angle relative to the support frame.

4. A power unit as in claim 1 in which said motor controller is attached to the handle of a golf cart.

5. A power unit as in claim 1 in which the bag support frame of the golf cart, to which the power unit is attachable, has opposed first and second ends, the first end being oriented lower when the cart is in use and the handle being attached to the support frame adjacent the second end, and wherein the first end of said leg of the power unit is releasably securable to the bag support frame at a location adjacent the second end of the bag support frame by means of said releasable coupling.

6. A power unit as in claim 5 in which said leg is a generally straight shaft attachable to the central member of the golf bag support frame at said first end of said leg by means of said releasable coupling said leg being positioned such that said pair of drive wheels engage the ground and support the second end of said support frame when the powered unit is attached to the golf cart.

7. A power unit as in claim 6 in which the distance between said drive wheels on the power unit is less than the distance between the cart wheels when the golf cart is in use.

8. A power unit as in claim 6 in which said leg is a tubular shaft.

9. A power unit as in claim 1 in which the golf cart is a collapsible cart having wheels that are movable between an extended configuration, wherein the cart wheels are spaced apart for supporting the cart, and a collapsed configuration wherein the cart wheels are folded into closer proximity to the support frame of the cart for transport and storage, and in which the releasable coupling of the power unit permits movement of said leg between an extended position in which the leg is oriented relative to the support frame at an angle of between 60° and 90°, and a folded position in which said leg is at an angle of between 20° and 0° relative to the support frame.

10. A power unit as in claim 1 in which said motor controller is attachable to the handle of the golf cart.

11. A power unit as in claim 1 in which said motor controller includes an on/off switch, a speed selector and a motor direction selector, and said motor is reversible to drive said rotatable axle and said drive wheels in either rotational direction in response to said motor direction selector.

12. A motorized cart for carrying a golf bag, comprising:
a support frame having first an second ends, the first end being lower than the second end and the support frame angling generally upwardly from said first to said second end,
a pair of non-motorized cart wheels supported on said frame on opposite sides of said support frame,
a handle for moving and steering the cart attached to said support frame adjacent said second end of said support frame,
a single, unitary leg for supporting a power unit on the cart, said leg being attached at one end to said support frame adjacent said second end of said support frame by means of a releasable coupling which permits said leg to be selectively oriented relative to said support frame,
an electric motor and drive wheel assembly attached in a fixed nonpivotable orientation on the other end of said leg, opposite said one end of said leg, said assembly including a pair of drive wheels turned by said electric motor to move the motorized cart over the ground,
a battery support attached to said leg above said electric motor and drive wheel assembly for supporting a battery to energize said motor, and
a motor controller mounted on said handle and electrically connected to said motor and drive wheel assembly and connectable to a battery on said battery support for controlling said motor.

13. A motorized cart as in claim 12, in which said non-motorized cart wheels are collapsible against said support frame and said leg for supporting a power unit is also collapsible against said support frame, said leg being collapsible by releasing said releasable coupling to permit movement of said leg to a position adjacent said support frame of said cart.

14. A motorized cart as in claim 12, in which said leg is a straight tubular shaft.

15. A motorized cart as in claim 14, in which said leg is attached to said support frame only adjacent said second end of said support frame.

16. A motorized cart as in claim 12, in which the drive wheels on said electric motor and drive wheel assembly support the second end of said motorized cart and the cart wheels and the non-motorized cart wheels support the first end of said cart, whereby the cart is supported on four wheels.

17. A motorized cart as in claim 12, in which said releasable coupling permits said leg to be oriented relative to said support frame at a selectable angle relative to said support frame, including a small or zero angle in which said leg is collapsed against said support frame.

* * * * *